United States Patent [19]

Okawa et al.

[11] Patent Number: 5,276,133
[45] Date of Patent: Jan. 4, 1994

[54] FAVORABLY PROCESSABLE POLYIMIDE AND PROCESS FOR PREPARING POLYIMIDE

[75] Inventors: Yuichi Okawa; Shoji Tamai; Akihiro Yamaguchi, all of Kanagawa, Japan

[73] Assignee: Mitsui Toatsu Chemicals, Inc., Tokyo, Japan

[21] Appl. No.: 894,346

[22] Filed: Jun. 4, 1992

[30] Foreign Application Priority Data

Jun. 14, 1991 [JP] Japan ................... 3-142874

[51] Int. Cl.⁵ ................ C08G 69/26; C08G 73/10
[52] U.S. Cl. ...................... 528/353; 528/125; 528/128; 528/172; 528/173; 528/176; 528/185; 528/188; 528/220; 528/229; 528/352
[58] Field of Search ............... 528/353, 352, 125, 176, 528/128, 185, 188, 220, 229, 172, 173

[56] References Cited

U.S. PATENT DOCUMENTS

| | | | |
|---|---|---|---|
| 3,959,350 | 5/1976 | Rogers | 528/353 |
| 4,161,492 | 7/1979 | Weissel | 528/353 |
| 4,925,916 | 5/1990 | Harris | 528/353 |
| 4,970,292 | 11/1990 | Bockroth | 528/353 |
| 4,994,544 | 2/1991 | Nagahiro | 528/353 |
| 4,996,293 | 2/1991 | Tsuyoshi | 528/352 |
| 5,032,667 | 7/1991 | Harris | 528/353 |

FOREIGN PATENT DOCUMENTS 200204 11/1986 European Pat. Off. .

*Primary Examiner*—John Kight, III
*Assistant Examiner*—P. Hampton-Hightower
*Attorney, Agent, or Firm*—Burns, Doane, Swecker & Mathis

[57] ABSTRACT

A favorably processable polyimide which has recurring structural units represented by the formula (I):

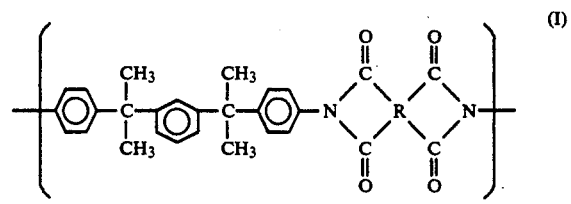

wherein R is a tetravalent radical having from 2 to 27 carbon atoms and is selected from the group consisting of an aliphatic radical, alicyclic radical, monoaromatic radical, condensed polyaromatic radical and noncondensed aromatic radical connected to each other with a direct bond or a bridge member, and is blocked at the polymer chain end with aromatic dicarboxylic anhydride represented by the formula (II):

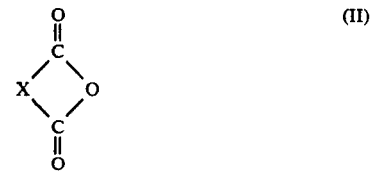

wherein X is a divalent radical selected from the group consisting of a monoaromatic radical having from 6 to 27 carbon atoms, condensed polyaromatic radical and noncondensed aromatic radical connected to each other with a direct bond or a bridge member.

4 Claims, 2 Drawing Sheets

FAVORABLY PROCESSABLE POLYIMIDE AND PROCESS FOR PREPARING POLYIMIDE

BACKGROUND OF THE INVENTION

1. Field of the Invention

The present invention relates to melt-processable polyimide and more particularly relates to polyimide having excellent processability and a process for preparing the polyimide.

2. Related Art of the Invention

Conventionally, polyimide prepared by reaction of tetracarboxylic acid dianhydride with diamine is excellent in mechanical strength and dimensional stability in addition to exhibiting high heat-resistance and also has flame retardance and electrical insulative properties. Consequently, polyimide has been used in the fields such as electric and electronic devices, space and aeronautic equipment, and transport machinery, and is expected for wide use in additional fields where heat resistance is required.

Various kinds of polyimide which exhibit excellent properties have conventionally been developed. The polyimide, however, has no distinct glass transition temperature, though excellent in heat resistance, and must be processed by such means as sinter molding when used as a molding material. Other polyimides dissolve in halogenated hydrocarbon solvents, though excellent in processability, and lead to problems in solvent resistance. Thus, both merits and drawbacks have simultaneously been found in the properties of conventional polyimide. For example, polyimides prepared from 4,4'-diaminodiphenyl ether and pyromellitic dianhydride has a fundamental skeleton of the formula (V):

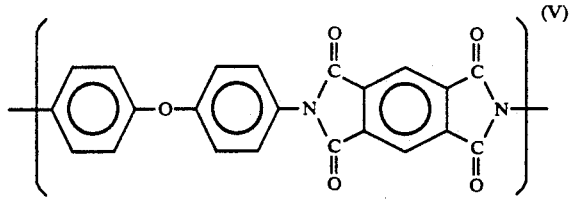

and has been known as high heat-resistant polyimide Kapton and Vespel (Trade mark; E. I. Du Pont de Nemours & Co.). The polyimide, however, has no distinct glass transition temperature and is difficult to process in molding articles, though excellent in heat resistance. Thus, the polyimide has a disadvantage that a technique such as sinter molding is required for processing.

Researches have been carried out on the use of diamine having an isopropylidene radical as a diamine component of polyimide. For example, polyimide which is prepared from pyromellitic dianhydride and has a fundamental skeleton of the formula (VI):

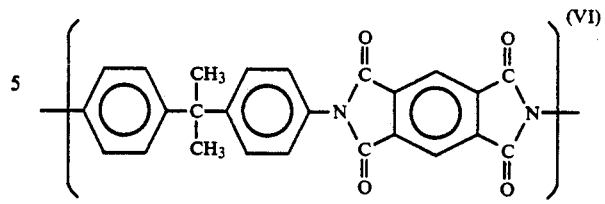

has been reported by G. M. Bower et al in J. Polymer Sci., pt-A, 1, 3135~3150(1963) and by C. E. Srog et al. in J. Polymer Sci., pt-A, 3, 1373~1390(1965). The polyimide, however, does not exhibit thermoplasticity and has no melt-flowability. As a result, the polyimide is disadvantageous in difficulty of processing.

SUMMARY OF THE INVENTION

The object of the invention is to provide polyimide having excellent processability in addition to essentially outstanding heat resistance.

The present inventors have carried out an intensive investigation in order to develop polyimide having improved processability without impairing heat resistance, mechanical properties and chemical resistance which are essential characteristics of polyimide, and have completed the present invention.

Accordingly, one aspect of the present invention is (1) a polyimide having recurring structural units represented by the formula (I):

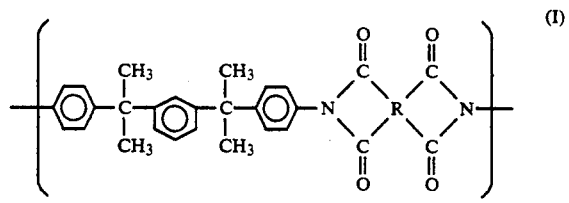

wherein R is a tetravalent radical having from 2 to 27 carbon atoms and is selected from the group consisting of an aliphatic radical, alicyclic radical, monoaromatic radical, condensed polyaromatic radical and noncondensed aromatic radical connected to each other with a direct bond or a bridge member;

(2) a polyimide which is blocked at the polymer chain end with dicarboxylic anhydride represented by the formula (II):

wherein x is a divalent radical having from 6 to 27 carbon atoms and is selected from the group consisting of a monoaromatic radical, condensed polyaromatic radical and noncondensed aromatic radical connected to each other with a direct bond or a bridge member, and has recurring structural units essentially represented by the formula (I):

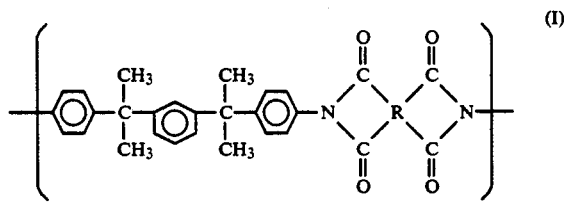

wherein R is a tetravalent radical having from 2 to 27 carbon atoms and is selected from the group consisting of an aliphatic radical, alicyclic radical, monoaromatic radical, condensed polyaromatic radical and noncondensed aromatic radical connected to each other with a direct bond or a bridge member; and, in particular, a favorably processable polyimide having an inherent viscosity of from 0.1 to 2.0 dl/g which is measured at 35° C. in a solution containing the polyimide at a concentration of 0.5 g/dl in a solvent mixture composed of 9 parts by weight of p-chlorophenol and 1 part by weight of phenol.

(3) A process for preparing the polyimide represented by the above formula (I) by reacting one mole of an aromatic diamine essentially consisting of 1,3-bis(4-amino-α,α-dimethylbenzyl)benzene of the formula (III):

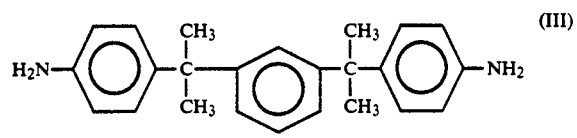

with from 0.8 to 1.0 mole of a tetracarboxylic dianhydride represented by the formula (IV):

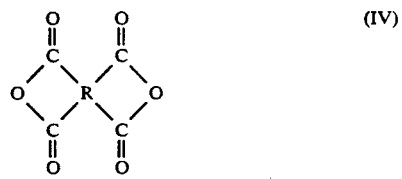

wherein R is a tetravalent radical having from 2 to 27 carbon atoms and is selected from the group consisting of an aliphatic radical, alicyclic radical, monoaromatic radical, condensed polyaromatic radical and noncondensed aromatic radical connected to each other with a direct bond or a bridge member, and successively by thermally or chemically imidizing the resulting polyamic acid; and (4) a process for preparing a polyimide which is essentially blocked at the polymer chain end with dicarboxylic anhydride by reacting 1 mole of aromatic diamine essentially consisting of 1,3-bis(4-amino-α,α-dimethylbenzyl)benzene of the above formula (III) with from 0.8 to 1.0 mole of tetracarboxylic dianhydride represented by the above formula (IV) in the presence of from 0.001 to 1.0 mole of dicarboxylic anhydride represented by the formula (II):

wherein X is a divalent radical having from 6 to 27 carbon atoms and is selected from the group consisting of a monoaromatic radical, condensed polyaromatic radical and noncondensed aromatic radical connected to each other with a direct bond or a bridge member, and successively by thermally or chemically imidizing the resulting polyamic acid.

Phthalic anhydride is particularly preferred as the aromatic dicarboxylic anhydride of the formula (II) which is used for blocking the polymer chain end in the polyimide of the invention.

The polyimide of the invention has excellent processability without impairing the essential heat-resistance of polyimide. The polyimide which is blocked at the polymer chain end with the above dicarboxylic anhydride is characterized by having extremely excellent processability and chemical resistance. The polyimide is excellent in melt-flow stability as compared with conventional polyimide and has remarkably improved processability. Thus, the present invention newly provides polyimide which is very useful in industry.

DETAILED DESCRIPTION OF THE INVENTION

Figure 1:
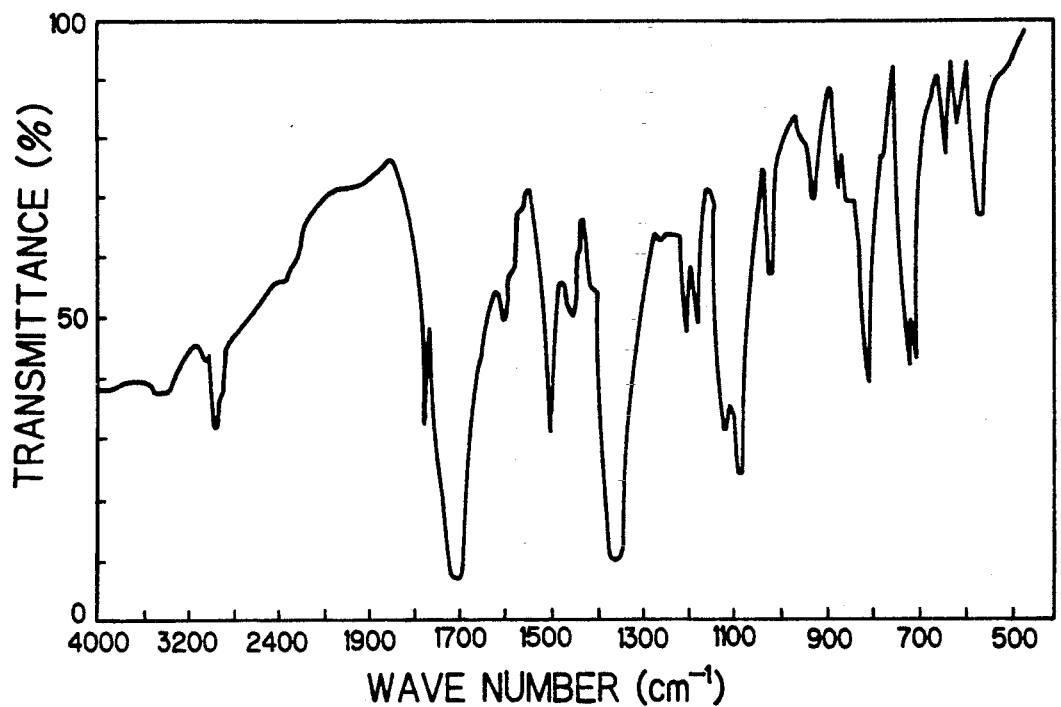
FIG. 1 is a drawing illustrating the IR absorption spectrum of the polyimide powder obtained in Example 1.

The polyimide of the invention has recurring structural units represented by the formula (I):

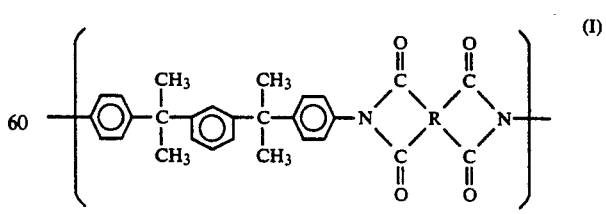

wherein R is the same as above and another polyimide of the invention is blocked at the polymer chain end with aromatic dicarboxylic anhydride represented by the formula (II):

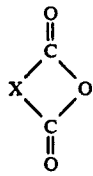

wherein X is the same as above.

These polyimides can be prepared by the following processes.

The raw material diamine compound which is used in the processes of the invention is 1,3-bis(4-amino-α,α-dimethylbenzenzyl)benzene of the formula (III):

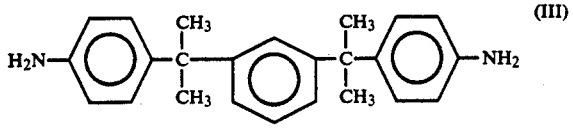

The polyimide of the invention is prepared by using the above diamine compound as a raw material. However, other diamines can also be used in combination as long as giving no adverse effect on the good properties of the polyimide.

Exemplary diamines which can be used in combination include, for example,
o-phenylenediamine, m-phenylenediamine, p-phenylenediamine,
m-aminobenzylamine, p-aminobenzylamine,
2-chloro-1,4-phenylenediamine,
4-chloro-1,2-phenylenediamine,
2,3-diaminotoluene, 2,4-diaminotoluene, 2,5-diaminotoluene,
2,6-diaminotoluene, 3,4-diaminotoluene,
2-methoxy-1,4-phenylenediamine,
4-methoxy-1,2-phenylenediamine,
4-methoxy-1,3-phenylenediamine, benzidine, 3,3'-dichlorobenzidine, 3,3'-dimethylbenzidine,
3,3'-dimethoxybenzidine
3,3'-diaminodiphenyl ether, 3,4'-diaminodiphenyl ether,
4,4'-diaminodiphenyl ether,
3,3'-diaminodiphenyl sulfide, 3,4'-diaminodiphenyl sulfide,
4,4'-diaminodiphenyl sulfide,
3,3'-diaminodiphenyl sulfoxide, 3,4'-diaminodiphenyl sulfoxide,
4,4'-diaminodiphenyl sulfoxide,
3,3'-diaminodiphenyl sulfone, 3,4' diaminodiphenyl sulfone,
4,4'-diaminodiphenyl sulfone,
3,3'-diaminodiphenylbenzophenone, 3,4'-diaminodiphenylbenzophenone,
4,4'-diaminodiphenylbenzophenone,
3,3'-diaminodiphenylmethane, 3,4'-diaminodiphenylmethane,
4,4'-diaminodiphenylmethane,
bis [4-(3-aminophenoxy)phenyl] methane,
bis [4-(4-aminophenoxy)phenyl] methane,
1,1-bis [4-(3-aminophenoxy)phenyl] ethane,
1,1-bis [4-(4-aminophenoxy)phenyl] ethane,
1,2-bis [4-(3-aminophenoxy)phenyl] ethane,
1,2-bis [4-(4-aminophenoxy)phenyl] ethane,
2,2-bis [4-(3-aminophenoxy)phenyl] ethane,
2,2-bis [4-(4-aminophenoxy)phenyl] ethane,
2,2-bis [4-(3-aminophenoxy)phenyl] propane,
2,2-bis [4-(4-aminophenoxy)phenyl] propane,
2,2-bis [4-(3-aminophenoxy)phenyl] butane,
2,2-bis [4-(4-aminophenoxy)phenyl] butane,
2,2-bis [4-(3-aminophenoxy)phenyl]-1,1,1,3,3,3-hexafluoropropane,
2,2-bis [4-(4-aminophenoxy)phenyl]-1,1,1,3,3,3-hexafluoropropane,
1,3 bis(3-aminophenoxy)benzene, 1,3-bis(4-aminophenoxy)benzene,
1,4-bis(3-aminophenoxy)benzene, 1,4-bis(4-aminophenoxy)benzene,
4,4'-bis(3-aminophenoxy)biphenyl, 4,4'-bis(4-aminophenoxy)biphenyl,
bis [4-(3-aminophenoxy)phenyl] ketone,
bis [4-(4-aminophenoxy)phenyl] ketone,
bis [4-(3-aminophenoxy)phenyl] sulfide,
bis [4-(4-aminophenoxy)phenyl] sulfide,
bis [4-(3-aminophenoxy)phenyl] sulfoxide,
bis [4-(4-aminophenoxy)phenyl] sulfoxide,
bis [4-(3-aminophenoxy)phenyl] sulfone,
bis [4-(4-aminophenoxy)phenyl] sulfone,
bis [4-(3-aminophenoxy)phenyl] ether,
bis [4-(4-aminophenoxy)phenyl] ether,
1,4-bis [4-(3-aminophenoxy)benzoyl] benzene,
1,3-bis [4-(3-aminophenoxy)benzoyl] benzene,
4,4'-bis [3-(4-aminophenoxy)benzoyl] diphenyl ether,
4,4'-bis [3-(3-aminophenoxy)benzoyl] diphenyl ether,
4,4'-bis [4-(4-amino-α,α-dimethylbenzyl)phenoxy] benzophenone,
4,4'-bis [4-(4-amino-α,α-dimethylbenzyl)phenoxy] diphenyl sulfone,
bis[4-{4-(4-aminophenoxy)phenoxy} phenyl] ketone,
bis[4-{4-(4-aminophenoxy)phenoxy} phenyl] sulfone,
1,4-bis [4-(4-aminophenoxy)-α,α-dimethylbenzyl] benzene,
1,3 bis [4-(4-aminophenoxy)-2,2-dimethylbenzyl] benzene, and
[4-{4-(4-aminophenoxy)phenoxy} phenyl] sulfone.

The tetracarboxylic dianhydrides which are used in the process of the invention and are represented by the formula (IV) include:

(a) an aliphatic radical having from 2 to 10 carbon atoms, (b) an alicyclic radical having from 4 to 10 carbon atoms, (c) a monoaromatic radical having the following formula:

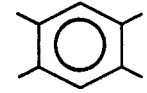

(d) a condensed polyaromatic radical having the following formulae:

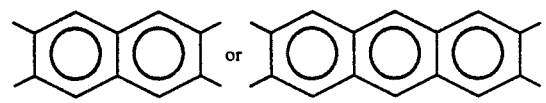

(e) a noncondensed aromatic radical connected each other with a direct bond or a bridge member and represented by the following formula:

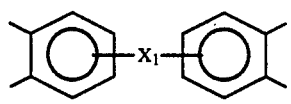

wherein $X_1$ is a direct bond, —O—, —S—, —SO$_2$—, —CH$_2$—, —CO—, —C(CH$_3$)$_2$—, —C(CF$_3$)$_2$—,

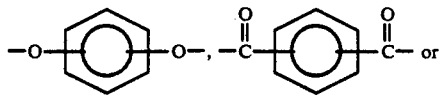

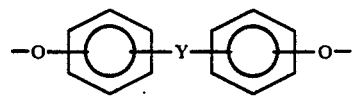

wherein Y is a direct bond, —O—, —S—, —SO$_2$—, —CH$_2$—, —CO—, —C(CH$_3$)$_2$—, —C(CF$_3$)$_2$—. Radicals having from 2 to 27 carbon atoms are preferably used. Practically, the tetracarboxylic dianhydrides include, for example, ethylenetetracarboxylic dianhydride, cyclopentanetetracarboxylic dianhydride, pyromellitic dianhydride, 3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl)ether dianhydride,
bis(3,4-dicarboxyphenyl)sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phanonthrenetetracarboxylic dianhydride.

The polyimide of the invention is prepared by reacting the aromatic diamine primarily composed of 1,3-bis(4-amino-α,α-dimethylbenzyl)benzene of the above formula (III) with the tetracarboxylic dianhydride primarily represented by the above formula (IV) and successively by thermally or chemically imidizing the resulting polyamic acid.

Another polyimide of the invention is prepared by reacting the aromatic diamine primarily composed of 1,3-bis(4-amino-α,α-dimethylbenzyl)benzene of the above formula (III) with the tetracarboxylic dianhydride represented by the above formula (IV) in the presence of an aromatic dicarboxylic anhydride represented by the formula (II):

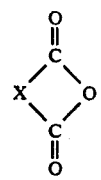

(II)

wherein X is a divalent radical having from 6 to 27 carbon atoms and is selected from the group consisting of a monoaromatic radical, condensed polyaromatic radical and noncondensed aromatic radical connected to each other with a direct bond or a bridge member, and successively by thermally or chemically imidizing the resultant polyamic acid.

The dicarboxylic anhydride which can be used in the process is a compound wherein X in the formula (II) is a divalent radical which has from 6 to 27 carbon atoms and corresponds to R$_1$ the aliphatic and alicyclic radical in the formula (I) exclusive. Practical examples of the dicarboxylic anhydride include phthalic anhydride,
2,3-benzophenonedicarboxylic anhydride,
3,4-benzophenonedicarboxylic anhydride,
2,3-dicarboxyphenyl-phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1.2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride, and
1,9-anthracenedicarboxylic anhydride.

These dicarboxylic anhydride may have a radical which has no reactivity with amine or dicarboxylic acid anhydride.

The amount of dicarboxylic anhydride is from 0.001 to 1.0 mole of 1,3-bis(4-amino-α,α-dimethylbenzyl)benzene. When the amount is less than 0.001 mole, melt viscosity is increased in high temperature processing and causes deterioration of processability. On the other hand, an amount exceeding 1.0 mole leads to a decrease in mechanical strength of processed articles, and the preferred range is from 0.01 to 0.5 mole.

Consequently, in the case of preparing the polyimide of the invention, the mole ratio of the tetracarboxylic dianhydride, aromatic diamine and dicarboxylic anhydride is in the range of from 0.8 to 1.0 mole of the tetracarboxylic dianhydride and from 0.001 to 1.0 mole of the dicarboxylic anhydride per mole of the aromatic diamine.

The mole ratio of aromatic diamine to tetracarboxylic dianhydride is usually adjusted in the preparation of polyimide in order to control the molecular weight of the formed polyimide. In the process of the invention, suitable mole ratios for providing polyimide having good melt flowability are in the range of from 0.8 to 1.0 mole of the tetracarboxylic dianhydride per mole of the aromatic diamine.

Any preparation process for polyimides including known processes can be applied to the preparation of the polyimide in the invention, and a particularly preferred process is carried out in an organic solvent.

Exemplary organic solvents which can be used in the preparation include, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis [2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-chlorophenol, and anisole. These solvents can be used singly or as a mixture.

In the process of the invention, 1,3-bis(4-amino-α,α-dimethylbenzyl)benzene, tetracarboxylic dianhydride and aromatic dicarboxylic anhydride can be added to the solvent by any one of the following methods:

(A) After reacting 1,3-bis(4-amino-α,α'-dimethylbenzyl)benzene with tetracarboxylic dianhydride, aromatic dicarboxylic anhydride is added to continue the reaction, (B) After reacting 1,3-bis(4-amino-α,α'-dimethylbenzyl)benzene with aromatic dicarboxylic anhydride, tetracarboxylic dianhydride is added to continue the reaction, and (C) 1,3-Bis(4-amino-α,α-dimethylbenzyl)benzene, tetracarboxylic dianhydride and aromatic dicarboxylic anhydride are simultaneously added to carry out the reaction.

When the aromatic dicarboxylic anhydride is not used, the same procedures can be carried out.

The reaction temperature is usually 250° C. or less, preferably 50° C., or less. No particular restriction is imposed upon the reaction pressure. The reaction can be satisfactorily carried out under atmospheric pressure. The reaction time differs depending upon the tetracarboxylic anhydride, solvent and reaction temperature, and is usually from 4 to 24 hours.

The resulting polyamic acid is thermally imidized by heating at 100° to 400° C. or chemically imidized by using an imidizing agent such as acetic anhydride to obtain polyimide having recurring units corresponding to the polyamic acid.

Alternatively, 1,3-bis(4-amino-α,α-dimethylbenzyl)-benzene, tetracarboxylic dianhydride and further aromatic dicarboxylic anhydride, if required, are dissolved in a solvent, and thereafter formation of polyamic acid precursor and imidization of the polyamic acid can be simultaneously carried out by heating the resulting solution to obtain the desired polyimide.

In the melt processing of the polyimide of the invention, other thermoplastic resins such as polyethylene, polypropylene, polycarbonate, polyarylate, polyamide, polysulfone, polyether sulfone, polyether ketone, polyphenylene sulfide, polyamideimide, polyetherimide, modified polyphenylene oxide can also be blended depending upon the desired use in an amount providing no adverse effect on the good properties of the polyimide of the invention.

Various additives used for common resin compositions can be used as long as not impairing the object of the invention. The additives which can be used include, for example, graphite, carborundum, silica powder, molybdenum disulfide, fluororesin and other abrasion resistance improvers; glass fiber, carbon fiber and other reinforcements; antimony trioxide, magnesium carbonate, calcium carbonate and other flame retardants; clay, mica and other electrical property improvers; asbestos, silica, graphite and other tracking resistance improvers; iron powder, zinc powder, aluminum powder, copper powder and other thermal conductivity improvers; and other miscellaneous materials such as glass beads, glass balloons, talc, diatomaceous earth, alumina, silicate balloons, hydrated alumina, metal oxides and colorants.

The present invention will hereinafter be illustrated by way of Examples and Comparative Examples.

Various properties of polyimide were measured by the following methods.

Inherent viscosity: Measured at 35° C. in a solution containing 0.5 g of the polyimide powder in 100 ml of a solvent mixture composed of 9 parts by weight of p-chlorophenol and 1 part by weight of phenol.

Glass transition temperature (Tg): Measured by DSC with Shimadzu DT-40 Series, DSC-41M.

5% Weight loss temperature: Measured by DTA-TG in the air with Shimadzu DT-Series DSC-40M.

Melt viscosity: Measured with Koka Type Flow Tester, CFT-500A under 100 kg lead by using an orifice having an internal diameter of 1 mm and a length of 10 mm.

EXAMPLE 1

To a reaction vessel equipped with a stirrer, reflux condenser and a nitrogen inlet tube, 34.45 g (0.100 mole) of 1,3-bis(4-amino-α,α-dimethylbenzyl)benzene and 272.44 g of N-methylpyrrolidone were charged, and 21.16 g (0.097 mole) of pyromellitic dianhydride was added dropwise at room temperature in a nitrogen atmosphere with caution to prevent temperature rise of the solution and stirred for 20 hours at room temperature. Thereafter 2.67 g (0.018 mole) of phthalic anhydride was added and stirred for 3 hours.

To the polyamic acid solution thus obtained, 324.66 g of N-methylpyrrolidone was added, and 1.30 g of isoquinoline and 40.84 g of acetic anhydride were added dropwise with stirring in a nitrogen atmosphere. After dropwise addition, the reaction mixture was stirred at 70° C. for 4 hours, cooled to room temperature and poured into 2 l of methyl ethyl ketone. The precipitated yellow powder was filtered, washed with methyl ethyl ketone, predried at 50° C. for 15 hours in a nitrogen atmosphere, and dried at 250° C. for 4 hours in a nitrogen atmosphere to obtain 51.84 g (98% yield) of polyimide powder. The polyimide powder thus obtained had an inherent viscosity of 0.42 dl/g, crystalline melting point (Tm) of 404° C., and 5% weight loss temperature of 505° C. The IR absorption spectrum of the polyimide powder is illustrated in FIG. 1. In the spectrum atlas, characteristic absorption band of imide was clearly observed in the wave length of around 1780 $cm^{-1}$. Elemental analysis of the polyimide powder was as follows.

| | Elemental analysis | | |
|---|---|---|---|
| | C | H | N |
| Calculated (%) | 77.55 | 4.98 | 5.32 |
| Found (%) | 77.51 | 4.97 | 5.34 |

The melt viscosity of the polyimide powder was 2600 poise at 410° C.

Figure 2:
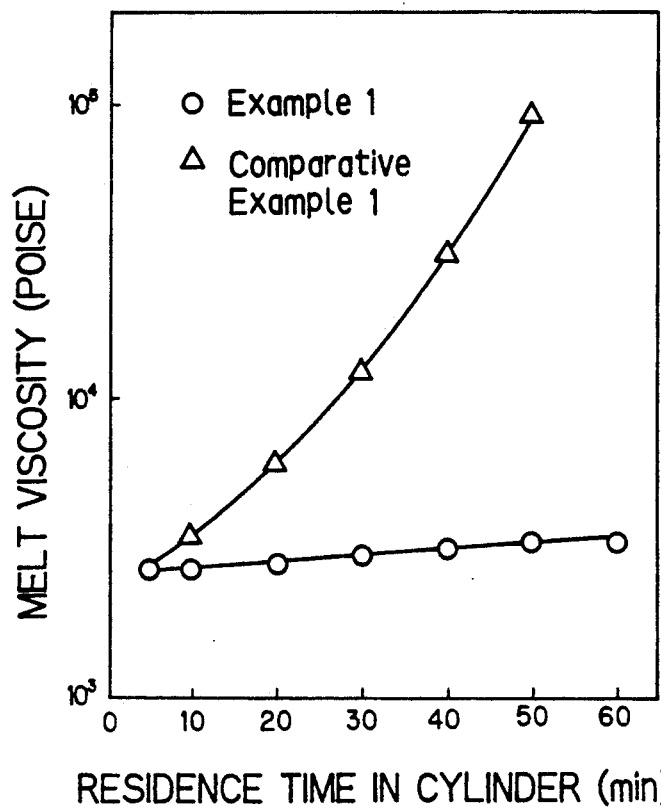
FIG. 2 is a drawing illustrating the comparison of processing stability between the polyimide powder obtained in Example 1 and Comparative Example 1 by measuring melt viscosity change with extended residence time in the cylinder of a flow tester at 410° C. under a load of 100 kg.

The processing stability of the polyimide powder was measured by changing the residence time of the powder in the cylinder of a flow tester at 410° C. under a 100 kg load. Results are illustrated in FIG. 2. Melt viscosity was almost constant although residence time was extended and proved good heat-stability of the polyimide powder.

COMPARATIVE EXAMPLE 1

Polyimide powder was prepared by carrying out the same procedures as conducted in Example 1 except that phthalic anhydride was omitted. The polyimide had a crystalline melting point (Tm) of 401° C. and inherent viscosity of 0.43 dl/g. Melt viscosity change was measured by extending the residence time in the cylinder of the flow tester as conducted in Example 1. As illustrated in FIG. 2, melt viscosity was increased with prolonged residence time. The heat stability of the polyimide powder thus obtained was inferior to that of Example 1.

EXAMPLE 2

To a reaction vessel equipped with a stirrer, reflux condenser and a nitrogen inlet tube, 34.45 g (0.100 mole) of 1,3-bis(4-amino-$\alpha,\alpha$-dimethylbenzyl)benzene and 222.44 g of N-methylpyrrolidone were charged, and 30.61 g (0.095 mole) of 3,3',4,4'-benzophenonetetracarboxylic dianhydride was added at room temperature in a nitrogen atmosphere with caution to prevent temperature rise of the solution, and stirred for 20 hours at room temperature. Thereafter 4.80 g (0.032 mole) of phthalic anhydride was added and further stirred for 3 hours.

To the polyamic acid solution thus obtained, 324.66 g of N-methylpyrrolidone was added, and 1.30 g of isoquinoline and 40.84 g of acetic anhydride were added dropwise with stirring in a nitrogen atmosphere. Successively the same procedures as conducted in Example 1 were carried out to obtain 61.67 g (98.0% yield) of polyimide powder.

Figure 3:
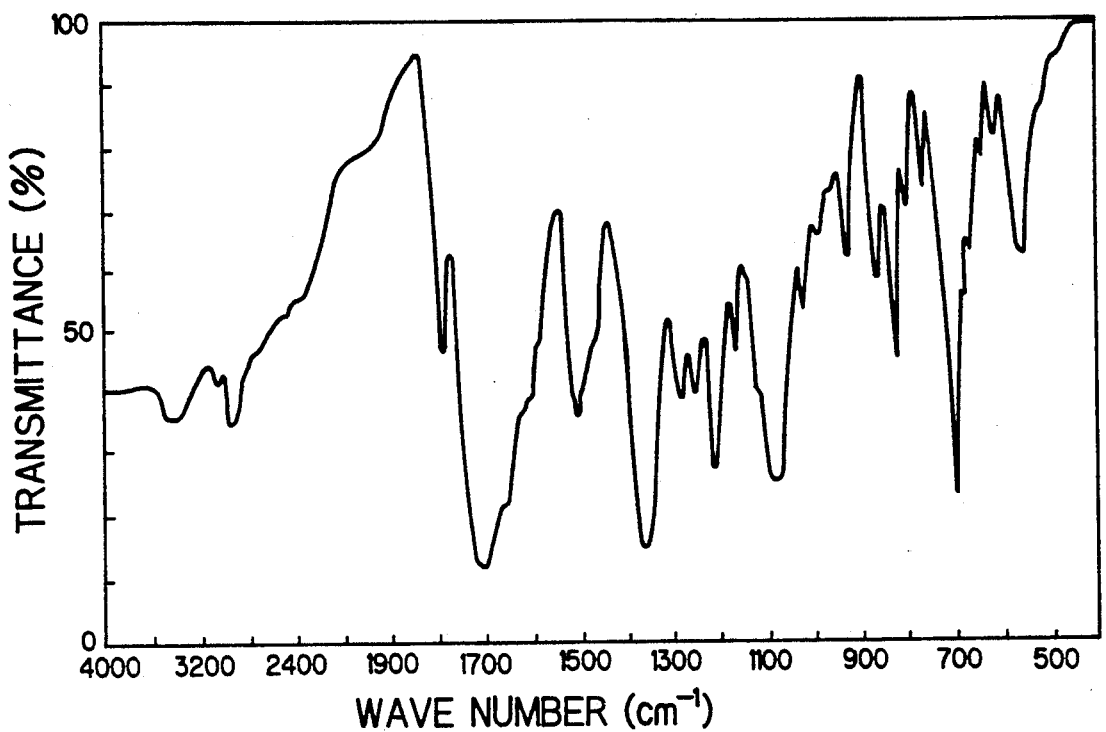
FIG. 3 is a drawing illustrating the IR absorption spectrum of the polyimide powder obtained in Example 2.

The polyimide powder thus obtained had an inherent viscosity of 0.54 dl/g, glass transition temperature (Tg) of 211° C., crystalline melting point (Tm) of 306° C., and 5% weight loss temperature of 522° C. The IR absorption spectrum of the polyimide powder is illustrated in FIG. 3. In the spectrum atlas, characteristic absorption band of imide was clearly observed in the wave length of around 1780 cm$^{-1}$ and 1720 cm$^{-1}$. Elemental analysis of the polyimide powder was as follows.

| Elemental analysis | C | H | N |
|---|---|---|---|
| Calculated (%) | 78.08 | 4.79 | 4.44 |
| Found (%) | 78.02 | 4.82 | 4.46 |

The melt viscosity of the polyimide powder was 8700 poise at 370° C. The extruded strand was light yellow, transparent, flexible and tough.

Figure 4:
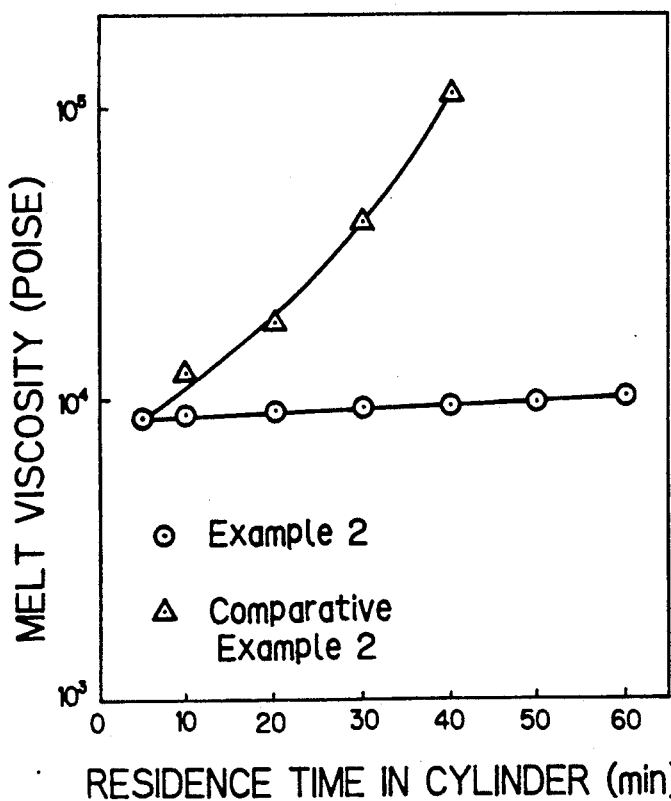
FIG. 4 is a drawing illustrating melt viscosity change of the polyimide powder obtained in Example 2 and Comparative Example 2 respectively, when the residence time is extended at 370° C. under a load of 100 kg

The processing stability of the polyimide powder was measured by changing the residence time of the powder in the cylinder of a flow tester at 370° C. under a 100 kg load. Results are illustrated in FIG. 4. Melt viscosity was almost constant although residence time was extended and proved good heat-stability of the polyimide powder.

COMPARATIVE EXAMPLE 2

Polyimide powder was prepared by carrying out the same procedures as conducted in Example 2 except that phthalic anhydride was omitted. The polyimide had a glass transition temperature (Tg) of 212° C. and inherent viscosity of 0.53 dl/g. Melt viscosity change was measured by extending the residence time in the cylinder of the flow tester as conducted in Example 2. As illustrated in FIG. 4, melt viscosity was increased with prolonged residence time. The heat stability of the polyimide powder thus obtained was inferior to that of Example 2.

EXAMPLE 3

Polyimide powder was prepared by carrying out the same procedures as conducted in Example 2 except that phthalic anhydride was replaced by 6.34 g (0.032 mole) of 2,3-naphthalenedicarboxylic acid.

EXAMPLES 4 AND 5

Polyimide powder was prepared by carrying out the same procedures as conducted in Example 1 except that pyromellitic dianhydride was replaced by 28.25 g (0.096 mole) of 3,3',4,4'-biphenyltetracarboxylic dianhydride in Example 4 and 29.78 g (0.0096 mole) of bis(3,4-dicarboxyphenyl) ether dianhydride in Example 5, respectively.

EXAMPLE 6

Polyimide powder was prepared by carrying out the same procedures as conducted in Example 1 except that pyromellitic dianhydride was replaced by 28.2 g (0.096 mole) of 3,3',4,4'-biphenyltetracarboxylic dianhydride and phthalic anhydride was replaced by 6.05 g (0.024 mole) of 3,4-benzophenonedicarboxylic anhydride, respectively.

EXAMPLE 7

Polyimide powder was prepared by carrying out the same procedures as conducted in Example 1 except that pyromellitic dianhydride was replaced by 29.78 g (0.096 mole) of bis(3,4-dicarboxyphenyl)ether dianhydride and phthalic anhydride was replaced by 4.76 g (0.024 mole) of 2,3-naphthalenedicarboxylic anhydride, respectively.

Table 1 summarizes diamine compounds, tetracarboxylic dianhydride, dicarboxylic anhydrides and properties of resulting polyimide in Example 3~8.

TABLE 1

| Example | Diamine compound g (mole) | tetracarboxylic dianhydride g (mole)*1 | Dicarboxylic anhydride g (mole)*2 | Inherent viscosity (dl/g) |
|---|---|---|---|---|
| 3 | 1,3-bis(4-amino-$\alpha,\alpha$-dimethylbenzyl)benzene 34.45(0.10) | BTDA 30.61(0.095) | NA 6.34(0.032) | 0.52 |
| 4 | 1,3-bis(4-amino-$\alpha,\alpha$-dimethylbenzyl)benzene 34.45(0.10) | BPDA 28.25(0.096) 0.45 | PA 3.55(0.024) | 0.48 |
| 5 | 1,3-bis(4-amino-$\alpha,\alpha$-dimethylbenzyl)benzene 34.45(0.10) | ODPA 29.78(0.096) | PA 3.55(0.024) | 0.45 |
| 6 | 1,3-bis(4-amino-$\alpha,\alpha$-dimethylbenzyl)benzene 34.45(0.10) | BPDA | BA | 0.47 |
| 7 | 1,3-bis(4-amino-$\alpha,\alpha$-dimethylbenzyl)benzene 34.45(0.10) | ODPA 29.78(0.096) | NA 4.76(0.024) | 0.46 |

| Glass transition temperature (°C.) | 5% Weight loss temperature (°C.) | Elemental analysis (%) | | |
|---|---|---|---|---|
| | | | C | H | N |
| 210 | 523 | Calculated | 78.08 | 4.79 | 4.44 |

TABLE 1-continued

| | | | Found | 78.05 | 4.83 | 4.47 |
|---|---|---|---|---|---|---|
| 223 | 518 | Calculated | | 79.72 | 5.02 | 4.65 |
| | | Found | | 79.68 | 5.03 | 4.68 |
| 198 | 508 | Calculated | | 77.65 | 4.89 | 4.53 |
| | | Found | | 77.64 | 4.86 | 4.55 |
| 220 | 515 | Calculated | | 79.72 | 5.02 | 4.65 |
| | | Found | | 79.70 | 5.04 | 4.64 |
| 196 | 512 | Calculated | | 77.65 | 4.89 | 4.53 |
| | | Found | | 77.64 | 4.86 | 4.55 |

Note:
*¹PMDA: Pyromellitic dianhydride
BTDA: 3,3'-4,4'-Benzophenonetetracarboxylic dianhydride
BPDA: 3,3'-4,4'-Biphenyltetracarboxylic dianhydride
ODPA: Bis(3,4-dicarboxyphenyl) ether dianhydride
*²BA: 3,4-Benzophenonedicarboxylic anhydride
NA: 2,3-Naphthalenedicarboxylic anhydride
PA: Phthalic anhydride

We claim:

1. A polyimide which is blocked at the polymer chain end with dicarboxylic anhydride represented by the formula (II):

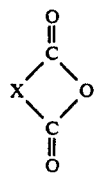

wherein X is a divalent radical having from 6 to 27 carbon atoms and selected from the group consisting of a monoaromatic radical, condensed polyaromatic radical and noncondensed aromatic radical connected to each other with a direct bond or a bridge member, and has recurring structural units essentially represented by the formula (I):

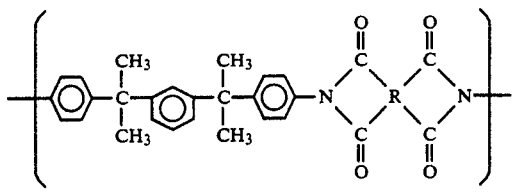

wherein R is a tetravalent radical having from 2 to 27 carbon atoms and is selected from the group consisting of an aliphatic radical, alicyclic radical, monoaromatic radical, condensed polyaromatic radical and noncondensed aromatic radical connected to each other with a direct bond or a bridge member.

2. The polyimide of claim 1 wherein the polyimide is in the range of from 0.1 to 2.0 dl/g in inherent viscosity measured at 35° C. in a solution containing the polyimide at a concentration of 0.5 g/dl in a solvent mixture composed of 9 parts by weight of p-chlorophenol and 1 part by weight of phenol.

3. A process for preparing the polyimide of claim 1 wherein one mole of an aromatic diamine essentially consisting of 1,3-bis(4-amino-α,α-dimethylbenzyl)benzene of the formula (III):

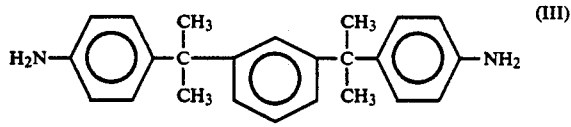

is reacted with from 0.8 to 1.0 mole of a tetracarboxylic dianhydride represented by the formula (IV):

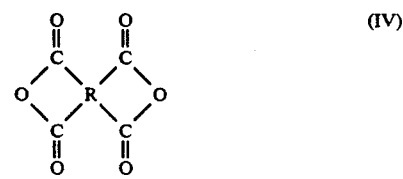

wherein R is a tetravalent radical having from 2 to 27 carbon atoms and is selected from the group consisting of an aliphatic radical, alicyclic radical, monoaromatic radical, condensed polyaromatic radical and noncondensed aromatic radical connected to each other with a direct bond or a bridge member with the proviso that R is not a divalent sulfone group, in the presence of from 0.001 to 1.0 mole of dicarboxylic acid anhydride represented by the formula (II):

wherein X is a divalent radical having from 6 to 27 carbon atoms and is selected from the group consisting of a monoaromatic radical, condensed polyaromatic radical and noncondensed aromatic radical connected to each other with a direct bond or a bridge member, and successively by thermally or chemically imidizing the resulting polyamic acid.

4. The process for preparing the polyimide of claim 3 wherein the aromatic dicarboxylic anhydride is phthalic anhydride.

* * * * *